(No Model.) 2 Sheets—Sheet 1.

W. KENNISH.
FUSE OR IGNITING DEVICE FOR PROJECTILES.

No. 400,687. Patented Apr. 2, 1889.

WITNESSES:
John A. Rennie.
J. B. Caplinger.

INVENTOR:
William Kennish.
By Henry Connett
Attorney.

(No Model.) 2 Sheets—Sheet 2.
W. KENNISH.
FUSE OR IGNITING DEVICE FOR PROJECTILES.
No. 400,687. Patented Apr. 2, 1889.
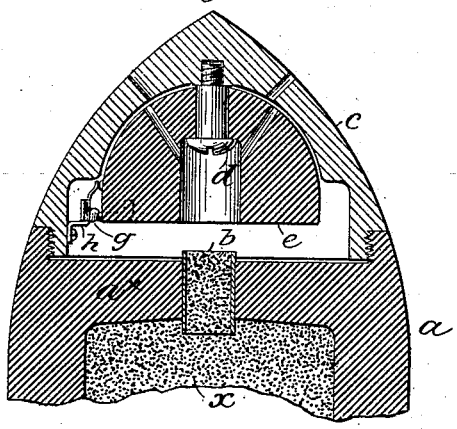
Fig: 6.
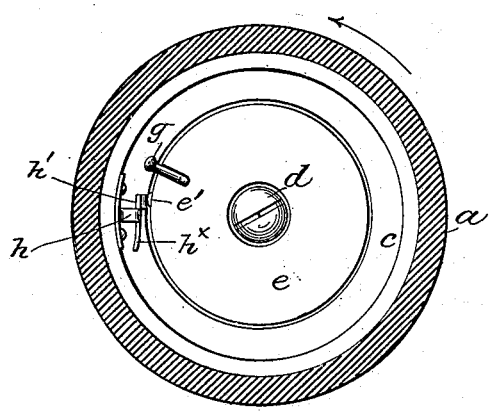
Fig: 7.
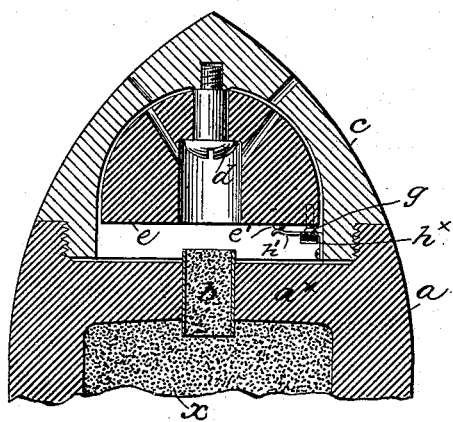
Fig: 8.
WITNESSES:
John A. Rennie.
INVENTOR:
William Kennish.
By Henry Connett
Attorney.

UNITED STATES PATENT OFFICE.

WILLIAM KENNISH, OF BROOKLYN, NEW YORK.

FUSE OR IGNITING DEVICE FOR PROJECTILES.

SPECIFICATION forming part of Letters Patent No. 400,687, dated April 2, 1889.

Application filed January 7, 1889. Serial No. 295,617. (No model.)

*To all whom it may concern:*

Be it known that I, WILLIAM KENNISH, a citizen of the United States, and a resident of Brooklyn, in the county of Kings and State of New York, have invented certain Improvements in Fuses or Igniting Devices for Projectiles, of which the following is a specification.

My invention relates to devices for igniting the charge in bursting projectiles, and it is adapted to both classes of projectiles—namely, those which burst at a predetermined time after leaving the gun, and which are commonly called "timed" shells, and those which do not burst until they strike an object, and which are commonly called "percussion-shells."

The object of my invention is, on the one hand, to insure the bursting of the shell or projectile by providing for certainty of ignition of the bursting-charge, and on the other hand to insure safety in the handling of the shells by providing against premature ignition.

My invention will be fully described hereinafter, and its novel features carefully defined in the claims.

Figure 1:
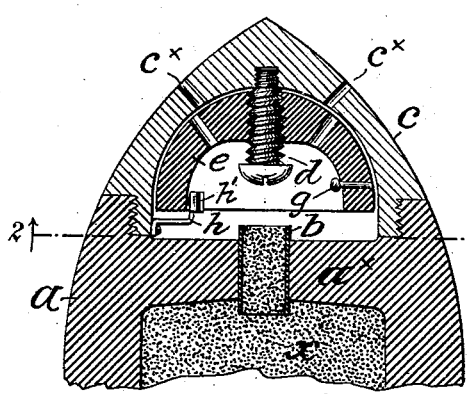
Figure 4:
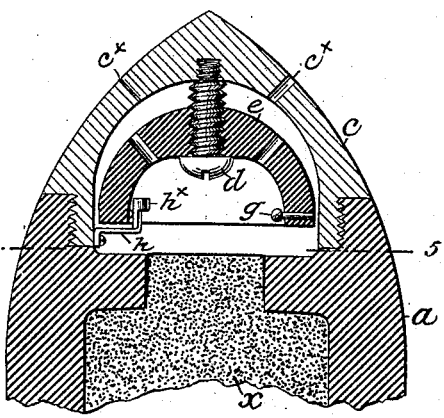
Figure 2:
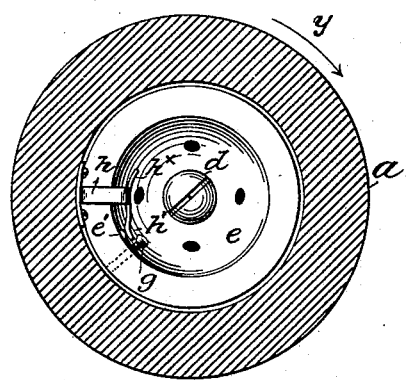
Figure 2A:
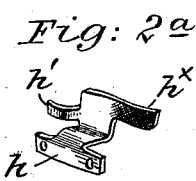
Figure 5:
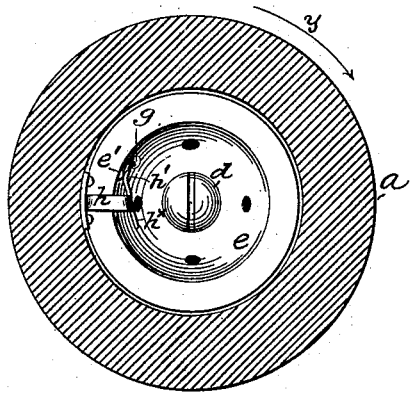
Figure 3:
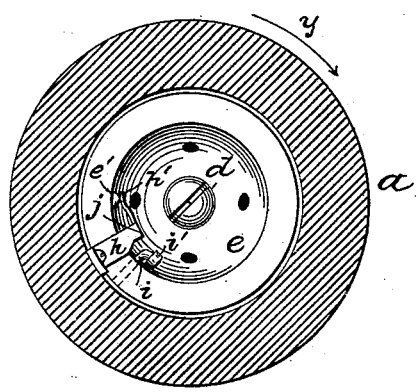

In the accompanying drawings, wherein my invention is illustrated, Figure 1 is a sectional view of a part of a conical rifle-projectile or timed shell provided with my improvements. Fig. 2 is a transverse section of the same in the plane indicated by line 2 2 in Fig. 1. Fig. 2ᵃ is a view of the friction piece and detent detached. Fig. 3 is a view similar to Fig. 2, illustrating the substitution of a percussion-ignitor in lieu of the friction-ignitor shown in Figs. 1 and 2. Figs. 4 and 5 are views similar in character to Figs. 1 and 2, illustrating the application of my invention to a percussion shell or projectile that bursts on striking an object that tends to arrest its forward and rotary motion. Figs. 6, 7, and 8 illustrate slight modifications in the construction.

I will first describe the construction illustrated in Figs. 1, 2, and 2ᵃ, premising that I have not deemed it necessary to illustrate the whole projectile, as my invention is confined to the tip or front end thereof. However, the invention is adapted only to elongated shells, to be fired from rifled guns, as I rely upon the axial rotation of the projectile to effect the operation of my fuse or ignitor.

$a$ represents the front end of the body of the shell, the chamber of which is filled with powder or other suitable explosive, $x$, forming the bursting-charge. The front end of the powder-chamber is closed by a cross-partition, $a^\times$, and in an aperture in this partition is fixed a "time-fuse," $b$, of the usual kind, or of any kind suited to the purpose. In the body of the shell is screwed a removable brass plug or cap, $c$, which forms, when in place, the conical tip of the shell. This cap $c$ will be provided with a suitable aperture or apertures, $c^\times$, to admit air to the chamber within the cap where the outer end of the fuse $b$ is situated.

In the axis of the projectile is a stud or screw, $d$, set tightly into the inner face of the cap $c$ and provided with a screw-threaded shank. On the shank of this screw is rotatively mounted a part, $e$, which I will call a "wheel," as it rotates in the manner of a wheel. This wheel has, by preference, the form of a hemisphere hollowed out on its inner side, as this form provides the maximum weight for a given diameter, which is desirable. The wheel $e$ should rotate quite freely on the screw. In the rim of the wheel $e$ and projecting inwardly is fixed a friction-ignitor, $g$. This ignitor may be of almost any kind—as, for example, a short stem inserted in a socket in the rim of the wheel and provided on its projecting end with a charge of fulminate or other substance capable of igniting readily by friction. An ordinary parlor-match, for example, with the stick properly shortened would serve the purpose if sufficiently sensitive.

On the inner face of the cap $c$, near its base, is secured a bracket-piece, $h$. (Seen detached in Fig. 2ᵃ.) This bracket-piece bears the friction-plate $h^\times$ and the spring-detent $h'$. The bracket-piece is so situated with respect to the ignitor $g$ that when the shell $a$ rotates in the direction of arrow $y$ in Fig. 2, the wheel $e$ remaining stationary, the roughened surface of the plate $h^\times$ on the bracket-piece $h$ will be brought into rasping contact with the fulminate on the ignitor $g$, and this will fire it in a well-known way. The flame from the ignitor will be instantly communicated to the inner end of the time-fuse b, and this fuse will in due time communicate with and ignite the bursting-charge x in the powder-chamber of the shell.

I will now explain the rationale of the operation. Suppose the battery is firing "five-second" shells. The gunner removes the cap c from the projectile, cuts the fuse b to five seconds, places an ignitor, g, in the socket in the wheel e, and turns said wheel to the position seen in Fig. 2. A light spring, h', on the piece h, which forms the detent, now presses on a slight protuberance, e', on the inner face of the rim of wheel e, and this serves to prevent accidental rotation of the wheel on the screw d during the further manipulation of the projectile. The projectile is now placed in the gun. When the gun is discharged, the rifles therein impart to the projectile rapid rotation axially; but the inertia of the wheel e will prevent it from partaking of this rotation, and consequently the first revolution of the shell, which will usually be completed as the projectile leaves the muzzle of the gun, will disengage the detent h' and carry the piece h around until the roughened plate $h^\times$ is brought forcibly into frictional contact with the head of the ignitor g, when the latter will be fired. Thus the time-fuse will be ignited at the moment the projectile leaves the gun, and the bursting-charge will be ignited at the end of five seconds thereafter in the case supposed. If desired, the ignition of the time-fuse may be effected by percussion instead of friction. In this case the only modification required will be that illustrated in Fig. 3. In lieu of a friction-ignitor the gunner inserts in the socket in wheel e an L-shaped nipple, i, on which is placed a percussion-cap, i', and where the projectile makes a revolution this cap is struck a smart blow by an anvil or hammer, j, on the piece h, which anvil is substituted for the roughened plate $h^\times$, before described.

Where the invention is applied to a so-called "percussion-shell" or shell that is designed to burst when it strikes an object, the wheel e is set to act in a manner inverse or opposite to that just described. In Figs. 4 and 5 I have illustrated the application of my invention to a projectile of this character, and this construction I will now describe. The wheel e in preparing the shell for firing is screwed back or inward until it is in contact with the head of the screw and will turn no farther. The ignitor g stands with relation to the piece h as represented in Fig. 5, and the detent holds the wheel against accidental rotation. When the projectile is fired, the rotation thereof tends to drive the screw d farther through the wheel e; but as the head of the screw is already in contact with said wheel the latter is carried around with the shell by this frictional contact, so that while the projectile is in transit there is no movement relatively of the piece h and the ignitor g; but when the projectile strikes an object its rotation is instantly retarded, as well as its forward motion in the line of its axis, and this retardation causes the wheel e, which is not retarded and which partakes of course of the momentum of the projectile, to rotate on the screw d in the same direction that the projectile was rotating, whereby the ignitor g is at once brought into frictional contact with the plate $h^\times$ and ignited. This ignition is communicated in the present case directly to the bursting-charge x, and the said charge is instantly exploded. It will be seen that in the case just described the momentum of the wheel e, tending to carry it forward, acts to rotate it on the screw, as well as does the centrifugal or rotary momentum, and one of these forces so supplements the other that if either is feeble the wheel will be rotated with force sufficient to effect the firing of the ignitor. The percussion device illustrated in Fig. 3 may be applied to this latter form of projectile, as well as to that first described.

In Figs. 1 and 4 the ignitor g is shown in a different position from that represented in Figs. 2 and 5. This is merely for convenience of illustration.

Figs. 6 and 7, which are views corresponding, respectively, to Figs. 1 and 2, illustrate another embodiment of my invention differing from that in the preceding views in but two respects—namely, the shank of the stud or screw d, on which the wheel e is rotatively mounted, is not screw-threaded, and the wheel has in consequence only a rotary movement thereon, and the ignitor g projects radially outward instead of inward.

Fig. 8 illustrates still another embodiment similar to that seen in Fig. 6, except that the ignitor g projects from the rear face of the wheel e and not radially therefrom, as in the other figures. These views, Figs. 6, 7, and 8, are merely designated to illustrate some of the many colorable variations in the arrangement of the elements that go to make up my device.

The disadvantage attending the mode of mounting the wheel illustrated in Figs. 6 and 8 consists in this, that the tendency to rotation imparted to the wheel by the sudden arrest of the forward movement of the projectile, which results from the screw-bearing of the wheel e, is entirely lost where the shank of the screw is left smooth, as in Figs. 6 and 8, and reliance must be placed entirely on the cessation of rotation of the projectile or the retardation thereof.

It will be obvious that the ignitor and the arrester (whether it be an anvil or friction-plate) may be interchanged—that is, the arrester may be carried by the wheel and the ignitor by the body of the projectile or the cap c.

Having thus described my invention, I claim—

1. An igniting device or fuse for an elongated rifle shell or projectile, consisting of a wheel rotatively mounted in a chamber in the projectile, with its axis of rotation coincident with the axis of rotation of the projectile, and an ignitor and arrester, one of which is borne by the projectile and the other by said wheel, said ignitor and arrester being arranged in the same circular path, whereby they are brought into contact by the rotation of the wheel relatively to the projectile.

2. The combination, with the body of the projectile, provided with a chambered tip or cap capable of removal, of the wheel rotatively mounted within said cap, its axis of rotation coinciding with that of the projectile, said projectile and wheel being provided, the one with a holder for the ignitor and the other with an arrester arranged in the same path with the ignitor, whereby the exploding charge is ignited by the rotation of said wheel relatively to the projectile.

3. The combination, with the body of the projectile, provided with a chambered tip or cap capable of removal, of a wheel rotatively mounted within said cap and having on its rim a holder for the ignitor, and an arrester carried by the projectile and arranged in the path of the ignitor carried by said wheel, whereby the ignitor is fired by the rotation of the wheel relatively to the projectile.

4. The combination, with the body of the projectile, provided with a chambered tip or cap capable of removal, of the wheel rotatively mounted within said cap and provided with a holder for the ignitor, the arrester carried by the projectile and arranged in the path of the ignitor carried by the wheel, and the detent whereby the wheel is held against accidental rotation while the projectile is being manipulated.

5. The combination, with the body of the projectile, provided with a chambered tip or cap, of the wheel rotatively mounted in said cap on a screw-bearing, the axis of rotation of said wheel coinciding with the axis of the projectile, said projectile and wheel being provided, the one with a holder for the ignitor and the other with an arrester in the same path with the ignitor.

In witness whereof I have hereunto signed my name in the presence of two subscribing witnesses.

WILLIAM KENNISH.

Witnesses:
HENRY CONNETT,
JOHN D. CAPLINGER.